United States Patent [19]

Shibata et al.

[11] Patent Number: 4,787,921
[45] Date of Patent: Nov. 29, 1988

[54] DEGASSING TUBE

[75] Inventors: Yoshihiko Shibata; Satoshi Ichiyasu; Kanako Omori, all of Okayama, Japan

[73] Assignee: Japan Gore-Tex, Inc., Japan

[21] Appl. No.: 95,329

[22] Filed: Sep. 10, 1987

[30] Foreign Application Priority Data

Sep. 10, 1986 [JP] Japan .................. 61-138026

[51] Int. Cl.$^4$ .............................................. B01D 19/00
[52] U.S. Cl. ........................................ 55/159; 55/52; 138/DIG. 3; 428/36.91
[58] Field of Search ............... 55/36, 52, 159, 199, 55/206; 261/122; 138/114, 140, 141, DIG. 3; 210/323.2, 437, 438, 439, 457, 458; 428/36

[56] References Cited

U.S. PATENT DOCUMENTS

| 1,988,478 | 1/1935 | Broadwell et al. | 261/122 X |
| 3,147,217 | 9/1964 | Halton | 261/122 X |
| 3,377,778 | 4/1968 | Gaertner | 55/52 |
| 3,490,752 | 1/1970 | Danjes et al. | 261/122 |
| 3,642,260 | 2/1972 | Danjes et al. | 261/122 |
| 3,711,072 | 1/1973 | Waldenville | 261/122 |
| 3,911,068 | 10/1975 | Hamilton | 261/122 X |
| 4,004,587 | 1/1977 | Jess | 55/159 X |
| 4,283,448 | 8/1981 | Bowman | 138/DIG. 3 |
| 4,531,954 | 7/1985 | Klein | 55/159 |
| 4,644,046 | 2/1987 | Yamada | 55/159 X |

FOREIGN PATENT DOCUMENTS

| 43774 | 1/1982 | European Pat. Off. | 55/36 |
| 2907188 | 8/1979 | Fed. Rep. of Germany | 55/159 |
| 60-48104 | 3/1985 | Japan | 55/159 |
| 1115772 | 9/1984 | U.S.S.R. | 55/199 |
| 1199440 | 7/1970 | United Kingdom | 55/36 |

Primary Examiner—Richard L. Chiesa
Attorney, Agent, or Firm—Mortenson & Uebler

[57] ABSTRACT

A degassing tubular device is provided having an inner tube of a porous polymeric resin positioned inside an outer tube of a porous polymeric resin, and having a tube-form body formed from a porous polymeric film interposed between the inner and outer tubes, wherein the porous polymeric film has a mean pore size of 0.2 to 3.0 microns. The inner tube, outer tube and film are preferably all of porous polytetrafluoroethylene.

2 Claims, 1 Drawing Sheet

DEGASSING TUBE

OBJECT OF THE INVENTION

The present invention concerns a degassing tube. The object of the invention is to provide a degassing tube which makes it possible to achieve a high gas permeability in the tube for the purpose of removing gaseous components contained in various types of liquids, and which at the same time makes it possible to maintain a high resistance to liquid pressure.

FIELD OF INDUSTRIAL UTILIZATION

The present invention may be utilized in degassing mechanisms for ultra-pure water used in LSI washing, aqueous solvent resin film raw materials [sic], and aqueous solvents used in liquid chromatography, etc.

In the past, degassing has been practiced in various forms in cases where the admixture of air or other gases in various types of liquids is undesirable. For example, respective degassing mechanisms have been employed in the case of ultra-pure water used in LSI washing, in the case of aqueous solvent resin raw materials, and in the case of aqueous solvents used in liquid chromatography, etc. In these cases, gases contained in the liquids involved are separated and removed using the aforementioned degassing mechanisms; in the past, porous polytetrafluoroethylene tubes have commonly been used for this purpose.

Problems Which the Present Invention Attempts to Solve

The abovementioned conventional porous polytetrafluoroethylene tubes are superior in terms of resistance to chemicals, and also have a desirable degassing action. In the case of such tubes, however, the resistance to hydraulic pressure drops if the gas permeability is increased. Conversely, if the resistance to hydraulic pressure is maintained at a high value, the gas permeability is unavoidably decreased. The relationship involved here is illustrated in FIG. 4. For example, if the gas permeability is increased from $5 \times 10^{-2}$ cc/cm$^2$-sec to $10 \times 10^{-2}$ cc/cm$^2$-sec; the resistance to liquid pressure (hydraulic pressure) drops from approximately 0.9 kg/cm$^2$ to approximately 0.3 kg/cm$^2$. Accordingly, a pressure resistance of 0.8 kg/cm$^2$, which is generally required in the case of such a tube, can no longer be obtained. Thus, conventional commercial porous polytetrafluoroethylene tubes do not allow an efficient degassing operation which involves both a high liquid pressure and a high gas permeation rate.

Accordingly, the only method that can be used to increase the degassing rate using a conventional degassing tube is to lengthen the tube so that the surface area is increased, or to increase the number of tubes used. However, the former method increase the resistance inside the tube, while the latter measure leads to an increase in the size of the equipment used. Thus, both methods involve either undesirable equipment or undesirable work. The high precision of various types of industrial work today does not allow the presence of gases in liquids to be overlooked. Gases in the aforementioned LSI wash water adhere in the LSI surfaces and cause problems in subsequent processing. Gases in the aforementioned resin raw materials lead to the generation of pinholes at the time of film formation and elsewhere. For these and other reasons, there is a strong demand for efficient degassing. However, this demand has not been suitably met.

DETAILED DESCRIPTION OF THE INVENTION

Means Used to Solve the Abovementioned Problems

The present invention is a degassing tube which is characterized by the fact that (a) said tube has an inner tube and an outer tube which consist of porous resin tubes, and (b) a tube-form body which is formed from a porous polytetrafluoroethylene film with a mean pore size of 0.2 to 3.0 microns is interposed between said inner and outer tubes.

Effect of the Invention

The abovementioned inner and outer tubes which consist of porous synthetic resin tubes act to support and protect the abovementioned tube-form body which is formed from a porous polytetrafluoroethylene film.

The aforementioned porous polytetrafluoroethylene film is the principal part which performs the degassing action of the present invention. Specifically, as a result of the fine pores of the film and the water-repellent nature of the material itself, the film allows the permeation of gases but effectively prevents the permeation of water.

By setting the pore size of the abovementioned porous film at 0.2 to 3.0 microns, it is possible to obtain a resistance to liquid pressure which is desirable for such a degassing operation, and at the same time to achieve an appropriate increase in the gas permeability of the film.

Practical Examples of Application of the Invention

A concrete practical working configuration of the present invention will be described below with reference to the attached figures:

Like conventional devices, the present invention also uses porous polytetrafluoroethylene tubes. In the present invention, however, as is shown in FIG. 1, porous polytetrafluoroethylene tubes are used as an inner tube (1) and an outer tube (3), and a tube-form body (2) consisting of a porous polytetrafluoroethylene film (4) is interposed between the aforementioned inner and outer tubes (1, 3).

The aforementioned tube-form body (2) can easily be manufactured as follows: i. e., both ends of a porous film (4) with a prescribed width are welded together (5) so that a tube-form body is formed as shown in FIG. 2. This tube-form body (2) is fit over the outside of the aforementioned tube (1), and the aforementioned tube (3) is fit over the outside of the tube-form body (2).

The aforementioned porous film (4) is given a porous structure by flat rolling/drawing; specifically, this film is obtained in a universally known manner as a spider-web type structure with countless microfibers connecting numerous micronodes. This fine fiber structure acts in conjunction with the water-repellent characteristics of the resin itself so that the permeation of gases is allowed, while the passage of liquids (especially water) is prevented. Accordingly, in the present invention, a tube-form body (2) formed from such a film (4) constitutes the main part which performs the degassing action of the invention. As a result, the pore size of the porous structure of the film is important. Specifically, since a film is used, it is essential that the thickness of the film be only a fraction of the thickness used in the case of a tube, in order to increase the gas permeability. In concrete terms, the film thickness should be 30 to 100 microns. Furthermore, the film can easily be formed with such a thickness by drawing, etc. Under such conditions, the pore size of the pores formed between the aforementioned microfibers should be approximately 0.2 to 3 microns. Specifically, in the case of a film in which this pore size exceeds 3 microns, a sufficient resistance to liquid pressure is not obtained. For example, in the case of a hydraulic pressure exceeding 0.8 kg/cm$^2$, some water passes through so that an effective degassing action cannot be achieved. On the other hand, if this pore size is less than 0.2 microns, it becomes difficult to achieve an appropriate gas permeability.

As an example, FIG. 3 shows the relationship between hydraulic pressure resistance and gas permeability in the case of a polytetrafluoroethylene film with a mean pore size of 0.2 to 1 micron, a film thickness of 65 microns and a porosity of 85 percent. At a hydraulic pressure resistance of 1.0 kg/cm$^2$, a gas permeability of 10 cc/cm$^2$-sec is sufficiently guaranteed; meanwhile, at a hydraulic pressure resistance of 0.5 kg/cm$^2$, a gas permeability of 30 cc/cm$^2$-sec can be sufficiently obtained.

As was described above, the main part with a degassing function in the present invention is the aforementioned tube-form body (2) consisting of a porous polytetrafluoroethylene film (4). Thus, in regard to the actions of the aformentioned inner tube (1) and outer tube (3), the technical nature of said tubes differs from that of conventional degassing tubes, even though said tubes may consist of the same porous polytetrafluoroethylene material as conventional degassing tubes. Specifically, said tubes (1, 3) act as supports and protectors of the aforementioned tube-form body (2). Thus, the pore sizes and thicknesses, etc., of these tubes are determined in this sense. Furthermore, in regard to the material of said tubes, porous structures consisting of vinyl chloride or polypropylene resins, etc., may be employed. The pore size of both of said tubes should be larger than the pore size of the aforementioned porous film (4). Furthermore, a mesh-form porous material may be also be used for said tubes; however, polytetrafluoroethylene tubes are desirable in order to present fouling or brusing of the tube-form body (2) consisting of the aforementioned film (4), and are desirable in cases where chemical resistance and heat resistance, etc., are required. Especially in the case of degassing tubes used in liquid chromatography, etc., it is necessary to take elution into account; in such cases, the use of such porous polytetrafluoroethylene tubes is desirable.

A few examples of manufacture of the present invention will be described below:

EXAMPLE OF MANUFACTURE 1

A tube-form body (2) consisting of a polytetrafluoroethylene film with a thickness of 50 microns, a porosity of 85% and a pore size of 0.45 microns was fit over the outside of a polytetrafluoroethylene inner tube (1) with an external diameter of 7.2 mm, an internal diameter of 6.0 mm, a porosity of 50% and a pore size of 3.5 microns. Next, an outer tube (3) with an external diameter of 10.0 mm, an internal diameter of 8.0 mm and the same porosity and pore size as those of the aforementioned inner tube (1) was fit over the outside of the aforementioned tube-form body (2) to produce a product of the present invention.

An aqueous solution at a temperature of 25° C. was fed into this tube of the present invention at a pressure of 1.5 kg/cm$^2$, and a degassing treatment was performed with the area outside the tube in a vacuum state at 70 cmHg. As a result, the amount of air passing through the tube-form body (2) to the outside was $8.0 \times 10^{-2}$ cc/cm$^2$-sec. The water inside the tube passed through the inner tube (1) and reached the tube-form body (2), but did not leak from said tube-form body (2). Thus, an effective degassing operation was successfully achieved.

EXAMPLE OF MANUFACTURE 2

A tube-form body (2) consisting of a porous polytetrafluoroethylene film with a thickness of 50 microns, a porosity of 85% and a pore size of 0.8 microns was fit over the outside of a polytetrafluoroethylene inner tube (1) with an external diameter of 7.2 mm, an internal diameter of 6.0 mm, a porosity of 70% and a pore size of 1.0 microns. Next, a polytetrafluoroethylene tube (3) with an external diameter of 10.0 mm, an internal diameter of 8.0 mm, a porosity of 70% and a pore size of 1.0 microns was fit over the outside of the aforementioned tube-form body (2) to produce a product of the present invention.

When a degassing treatment was performed using this product under the same conditions as in Example of Manufacture 1, the degassing rate that was achieved was $5.0 \times 10^{-2}$ cc/cm$^2$-sec. Furthermore, as in Example of Manufacture 1, there was no leakage of water from the outside.

Merits of the Invention

As was described above, the present invention provides a high-performance degassing tube which is endowed with a high resistance to liquid pressure and a high gas permeability. Accordingly, the present invention makes it possible to perform degassing treatments of liquids (required for high precision in various industrial fields) efficiently and inexpensively using a small apparatus. The present invention thus has great industrial merit.

BRIEF DESCRIPTION OF THE DRAWINGS

The attached figures illustrate the technical content of the present invention.

Figure 1:
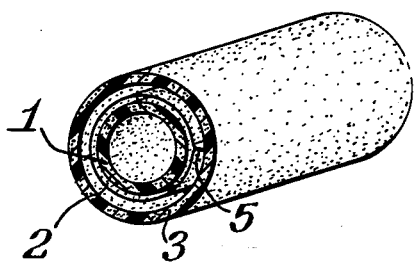
FIG. 1 is a cross section of a tube of the present invention.
Figure 2:
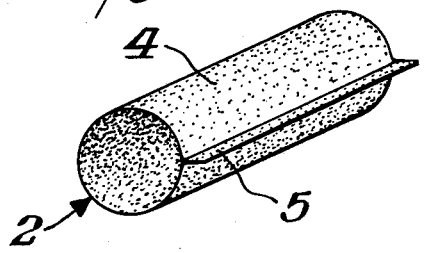
FIG. 2 is an oblique view of the tube-form body consisting of a porous polytetrafluoroethylene film used in the tube shown in FIG. 1.
Figure 3:
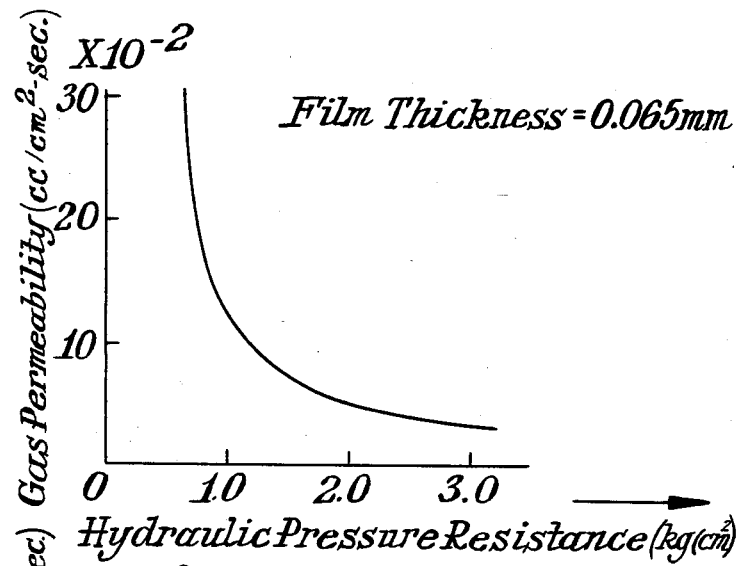
FIG. 3 is a graph which illustrates the relationship between hydraulic pressure resistance and gas permeability for one example of the aforementioned porous polytetrafluoroethylene film.
Figure 4:
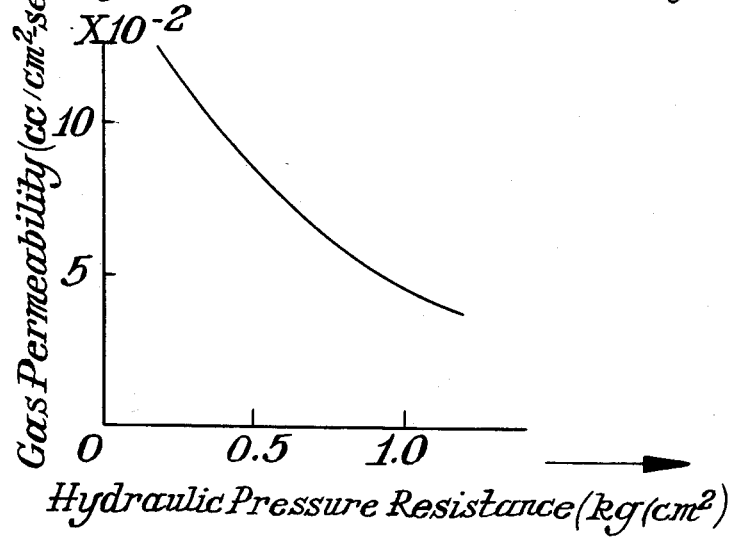
FIG. 4 is a graph which illustrates the relationship between hydraulic pressure resistance and gas permeability for a conventional porous polytetrafluoroethylene tube.

Furthermore, in the aforementioned FIGS. 1 and 2, (1) indicates an inner tube consisting of a porous tube, (2) indicates a tube-form body, (3) indicates an outer tube consisting of a porous tube, (4) indicates a porous polytetrafluoroethylene film which forms the aforementioned tube-form body, and (5) indicates a welded area.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A degassing tubular device comprising an inner tube of a porous polymeric resin positioned inside an outer tube of a porous polymeric resin, and a tube-form body formed from a porous polymeric film interposed between said inner and outer tubes, wherein said porous polymeric film has a mean pore size of 0.2 to 3.0 microns.

2. The degassing tubular device of claim 1 wherein said inner tube, said outer tube and said film are all of porous polytetrafluoroethylene.